Nov. 27, 1928.

E. A. GALLISON 1,692,984

FISH SCALING MACHINE

Filed Feb. 19, 1927

Nov. 27, 1928. 1,692,984
E. A. GALLISON
FISH SCALING MACHINE
Filed Feb. 19, 1927 3 Sheets-Sheet 2

Inventor
Ernest A. Gallison
by Roberts Cushman & Woodberry
Att'ys.

Nov. 27, 1928.
E. A. GALLISON
1,692,984
FISH SCALING MACHINE
Filed Feb. 19, 1927  3 Sheets-Sheet 3
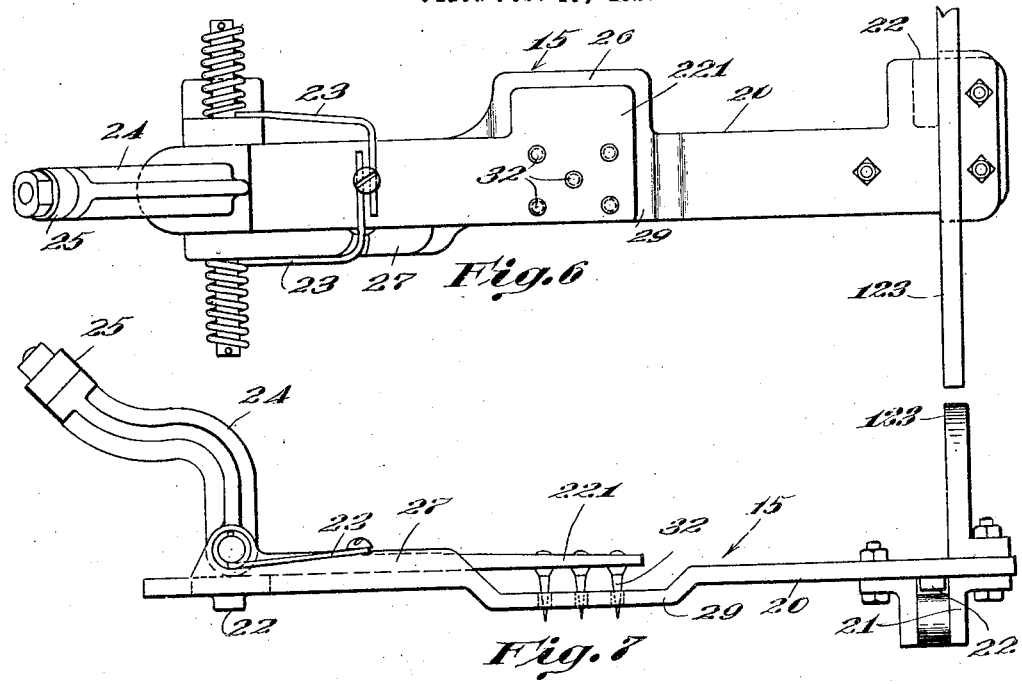
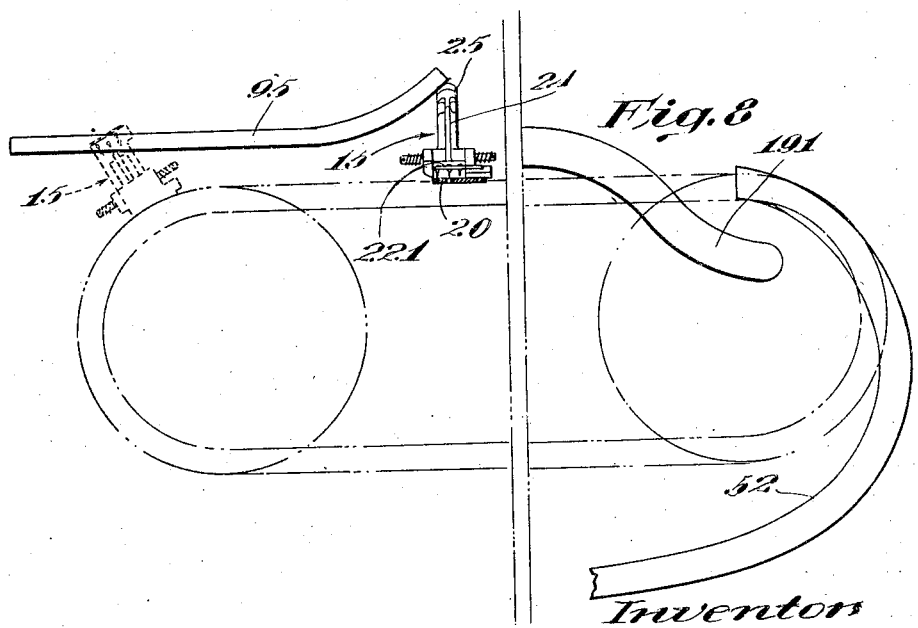
Inventor
Ernest A. Gallison
by Roberts Cushman & Woodbury
Attys.

Patented Nov. 27, 1928.

1,692,984

UNITED STATES PATENT OFFICE.

ERNEST A. GALLISON, OF WATERTOWN, MASSACHUSETTS, ASSIGNOR TO BAY STATE FISHING COMPANY, OF BOSTON, MASSACHUSETTS, A CORPORATION OF MAINE.

FISH-SCALING MACHINE.

Application filed February 19, 1927. Serial No. 169,623.

This invention relates to a machine for removing the scales from fish, being adapted to receive fish rapidly fed thereto by a single operator or by any desired means, to remove the scales, to count the scaled fish, and to emit the fish at a convenient point for further cutting or packing operations.

While machines of this general character have heretofore been proposed and tried, they generally have either failed satisfactorily to remove the scales or else have tended to tear the fish, because the scale-removing elements have had too harsh an action upon the fish. It has also been found more or less difficult to remove scales from all parts of the body of the fish. The present machine is designed to obviate these difficulties and provides successive scale-removing elements which are adapted to remove the scales from all parts of a fish. These elements may preferably be yieldable and are yieldably and adjustably arranged in order to engage the fish with the right degree of pressure to remove the scales and yet not to tear the skin. Means are also provided to engage the fish and carry it between the scale-removing elements as thus disposed and to deliver the scaled fish at a convenient point for removal.

The above and further advantageous features and objects of the invention will be apparent to those skilled in the art upon a reading of the subjoined claims in conjunction with the accompanying drawings, in which;

Fig. 5 is an elevation of a portion of the feeding device;

Fig. 6 is a top plan view of a clamp or grabber for engaging the fish and drawing it between scale-removing elements;

Fig. 7 is an elevational view of the same; and

Fig. 8 is a broken side elevation of the guides for opening and closing the clamps with related parts.

Figure 1:
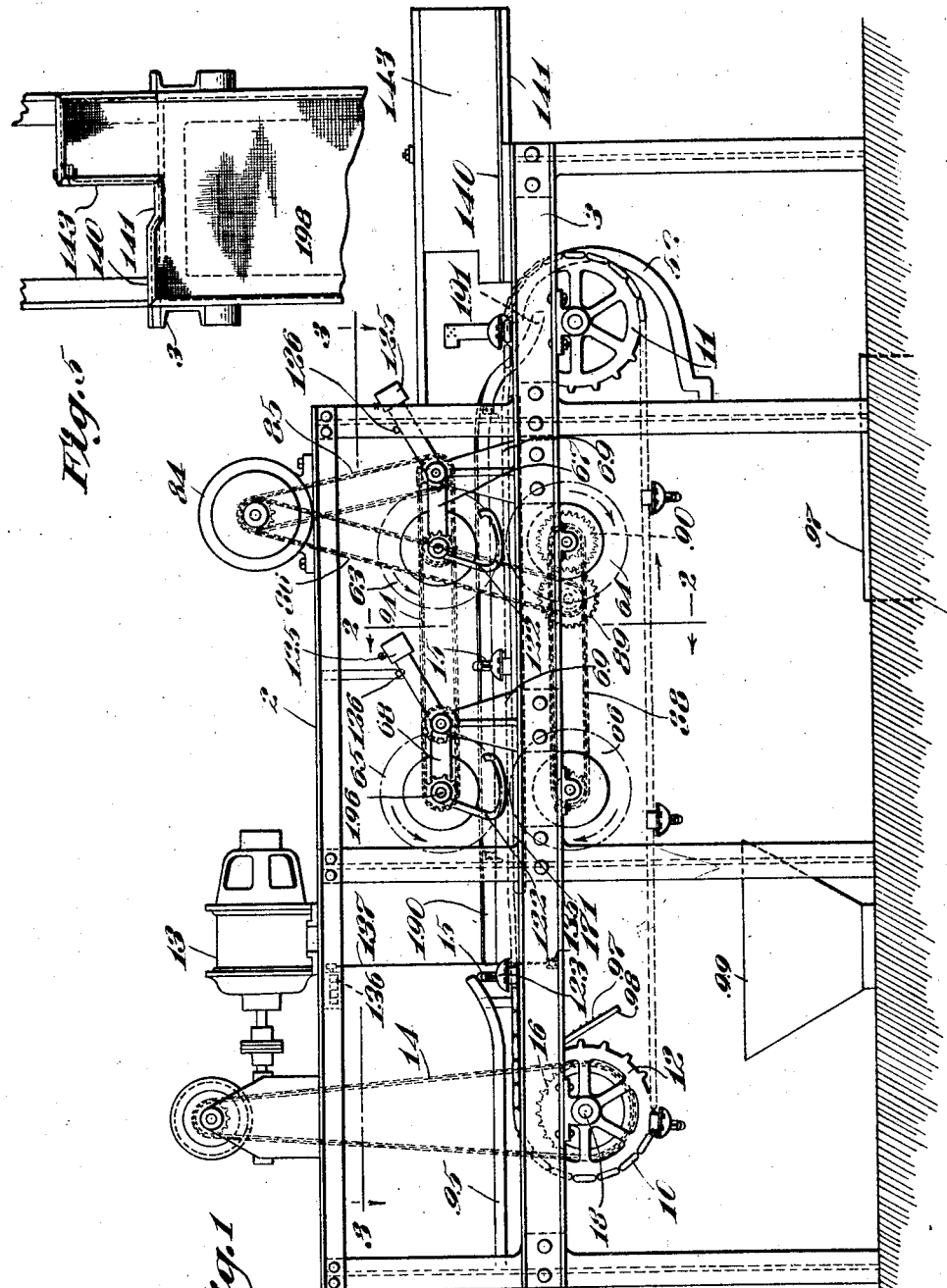
Fig. 1 is a side elevational view of the improved fish scaling machine with the driving means therefor.
Figure 2:
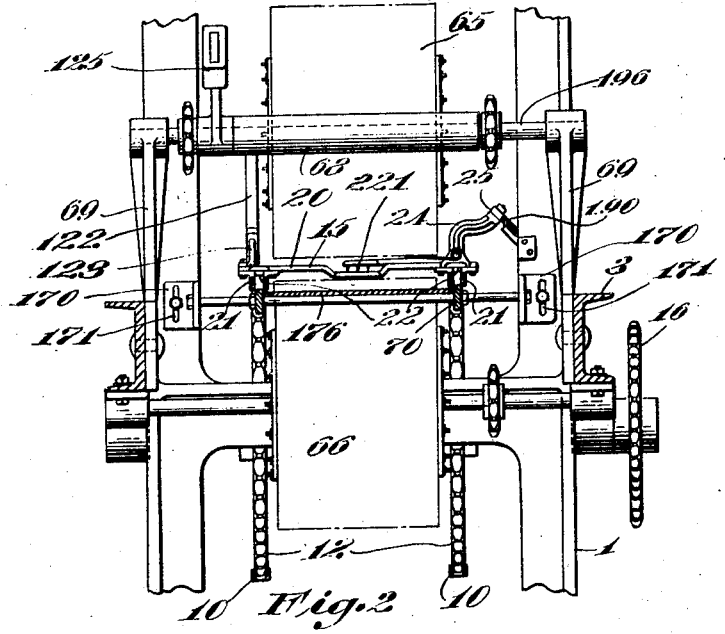
Fig. 2 is a section on line 2—2 of Fig. 1.
Figure 3:
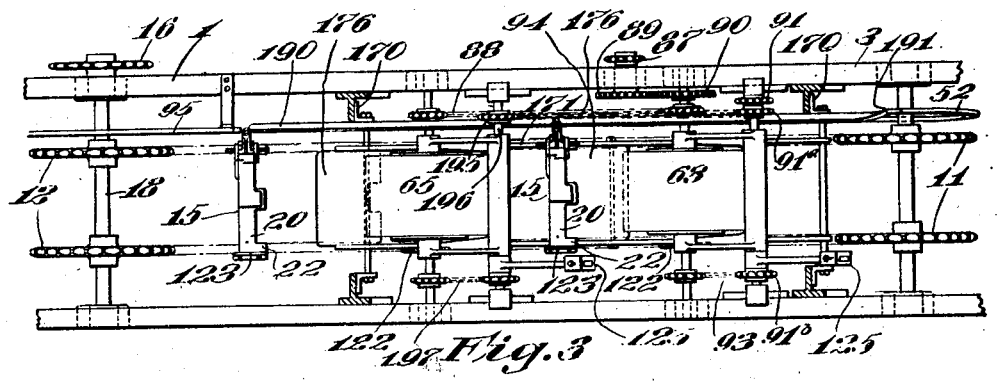
Fig. 3 is a section on line 3—3 of Fig. 1.

A machine of the type disclosed in the accompanying drawings preferably is provided with a supporting frame 1 which may conveniently be of standardized metal members to provide an upper platform 2 and longitudinal frame members 3 below the platform 2 and extending outward beyond one end of the same for purposes which will hereinafter be described. This frame is provided with suitable brackets and hangers for supporting the various component elements and factors of the machine.

Conveyor means is provided to draw the fish between scale removing elements or brushes and comprises a pair of parallel endless chains 10 which have substantially horizontal runs between sprockets 11 and 12. These chains are driven from a motor 13 by any suitable driving means such as chain 14 and sprocket 16 and both chains move at the same speed, the sprockets 12, and the drive sprocket 16 being keyed to a common shaft 18. Chains 10 are spaced apart an appropriate distance to support a plurality of fish-engaging clamps or grippers 15. One of these clamps is shown in detail in Figs. 6 and 7 and comprises a bottom member 20 which is supported upon brackets 21 each of which form a part of a link of a chain 10.

Bearing lugs 22 extend from member 20 and are adapted to rest upon rollers of adjoining links of the chain in order to brace the clamp against tipping. The upper portion of the clamp comprises a pivoted member 221 which is normally pressed downward substantially in engagement with the member 20 by spring elements 23. Member 221 is provided with an outstanding extension 24 carrying a roller 25 upon its upper end which is adapted to engage guide means to cause compression of the spring elements 23 and pivoting of the member 221 away from member 20. Clamp member 20 is provided with a flange 27 adapted to prevent the entrance of foreign bodies, such as spills from the scale-removing elements, between the parts of the clamp. The intermediate part of the lower clamp member 20 is provided with a depressed portion 29 which is adapted to engage the tail of a fish. A plurality of recesses or openings 30 in the intermediate portion 29 of member 20 are adapted to engage correspondingly arranged prongs 32 upon the upper clamp member (Fig. 6); the intermediate portions of both these members being extended to form toes 26 in order more firmly to engage the fish.

Adjoining sprocket 11 is the curved guide 52 which may be supported in any convenient manner from the table 9. This guide is shown more particularly in Fig. 8 and provides an edge to engage rollers 25 upon successive clamps 15, thus opening the clamps to the greatest degree when they arrive at a point adjoining the feed table 140. The tail of a fish hanging over a clamp at this point is then suddenly engaged by the closing of the clamp as the roller 25 leaves the guide element 52 and the springs 23 cause the member 21 with its prongs 32 to penetrate the fish which will be gripped between members 21 and 20.

The longitudinal guide strip 190 is disposed to have an edge closely paralleling the path of the rollers 25 so that accidental opening of the clamps is avoided. A downwardly extending end portion 191 of this guide strip terminates beneath the end of the guide member 52 and is adapted to cause positive closing of the clamps, if the springs 23 should for any reason fail to function.

The combined feed table and guard (Fig. 5) is located upon the longitudinal extension of the frame 1 which is provided by members 3. This feed table 140 is formed of sheet metal shaped to provide a trough 141 to receive fish which are fed tail foremost in the direction of the scale-removing elements. Table 140 is preferably provided with a box-like upward extension or guard 143 substantially to enclose the clamps 15 until they arrive at their fully opened position where they engage the tail of a fish. This guard serves to protect the hands of the operator and to prevent the fish engaging a partially opened clamp.

Figure 4:
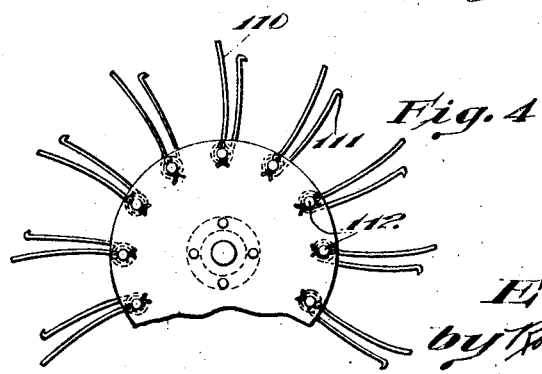
Fig. 4 is an elevational view of a scale-removing brush.

Clamps 15 will drag the fish between the pairs of scale-removing elements 63—64 and 65—66. These scale-removing elements may preferably be in the form of brushes one of which is shown more particularly in Fig. 4. Brush 63, for example, may preferably be of the type disclosed in the copending application of Raymond C. Mudge and Ernest A. Gallison No. 169,607 filed on even date herewith. The brush 63 is preferably provided with yieldably mounted spills 110, which may conveniently comprise metal strips bent to provide outstanding spill portions, which may be hooked as designated by the numeral 111. The metal is preferably bent to provide an intermediate loop which encircles and pivotally engages a support bar 112 upon the rotatable frame of the brush. When the brush frame is rotated, centrifugal force tends to throw the spill portions outwardly whereby the ends of the spills are yieldably cast against the surface of the fish. The hooked end portions of the spills and the yieldable mounting of the same are important features of the brush which permit more effective cleaning of scales from the fish.

In order to permit successive pairs of scale-removing members 63—64 and 65—66 to adapt themselves to fish of different sizes and shapes, the upper brushes 63 and 65 are mounted upon swinging arms 67 and 68, which pivot about fixed axles in brackets 69. Furthermore it is desirable to have the brushes raised slightly to clear the clamps as they pass between opposed pairs of brushes. For this purpose I secure metal runners 122 to the outer ends of supporting arms 67 and 68, the runners preferably being formed of strap metal bent to have a curved lower surface which is adapted to engage elevators 123 carried by one of the chains 10. These elevators are preferably secured to brackets 21 which hold the clamps in place (Fig. 7). The elevators are in the form of cam elements, each of which has a curved upper surface adapted to engage the runners 122 and lift a brush upwardly away from the path of the clamps. Counterweights 125 are secured to extensions of arms 67 and 68 and permit the brushes to be more easily raised. These extensions are adapted to engage suitable stops 126 to limit the downward movement of the swinging brushes and the corresponding runners so that the latter in their normal position may slightly clear chain 10.

Angle brackets 170 are adjustably secured to the frame 1 by the bolt and slot connections 171 and support the longitudinally disposed bars 70 which are adapted to form supports for the chain portions extending between the brushes. These brackets also support plates 176 which are adapted to hold fish at a proper level as they pass between the scale-removing elements. Normally bars 70 will be located slightly above sprockets 11 and 12 and adjustment of these bars in conjunction with the normal slack in the chains will permit considerable variation in the height of the path followed by the fish, and thus variation in the relation of the fish and the lower scale-removing elements 64 and 65, while the yieldably mounted upper elements are automatically self-adjustable to conform to the position of the fish as determined by adjustment of bars 70 and plates 176.

While the conveyor mechanism comprising the chains 10 and clamps 15 may be driven from the same source of power which also drives the scale-removing elements, these different parts of the machine preferably are driven from separate sources of power on account of the substantially higher speed of the scale-removing brushes. For this purpose I have shown a motor 84 which is provided with suitable sprockets and drive chains 85 and 86. Chain 86 engages a sprocket 87, driving a gear 89 which meshes with gear 90 secured to lower scale-removing element 64. A sprocket upon this axis engages a chain 88 to drive the other non-adjustable scale-removing element 66. Chain 85 drives the upper brushes 63 and 65 through sprocket 91, which drives sprockets $91^a$ and $91^b$, about which are wrapped chains 93 and 94, the former being connected to brush 63 and the latter to sprocket 195, mounted on shaft 196. A second sprocket on this shaft drives chain 197 and brush 65.

Adjoining sprocket 12 is disposed a guide member 95, shown more specifically in Fig. 8. This guide member is adapted to engage rollers 25 upon successive clamps and to open the same, thus permitting removal of the scaled fish. After leaving brushes 65 and 66 the body of the fish tends to drop and is caught by the short prongs 97 upon the inclined plate 98 which is located below the upper run of the chain. When the clamp opens and the body of the fish engages these prongs the fish is loosened from any engagement with the prongs 32 and drops into the chute 99, which conducts the fish to a lower floor where succeeding operations necessary to dressing and packing may take place.

The weight of the body of the fish as it swings toward plate 98 tends to aid loosening of the tail from engagement by the prong elements of the opened clamp. As the body of the fish swings downward in this manner it will normally strike against the paddle 135 which is connected by the wire 136 with the counter 137; thus each time a fish drops from the clamp the paddle will be tripped to actuate the counter once in order to provide a record of the total number of fish which are scaled.

Rotation of the scale-removing elements tends to throw the scales upon a portion of the floor adjoining opening 197, which may be provided for reception of the scales. Meshed screen 198 is disposed over the end of the lower part of the machine (Fig. 5) to prevent scales from being thrown upon the operator.

The operation of the machine is substantially as follows:

Fish are placed upon the trough 141 of feeding table 140 with their tails hanging over the edge of the same in a position to be grasped and penetrated by clamps 15 which close thereon due to the arrangement of springs 23 and guide element 52, the depressed extension 191 of guide strip 190 positively insuring substantial closing of the clamps. The fish is then drawn by the clamps over plates 176 and between successive pairs of scale-removing elements. The fish is thereupon carried to a position where the body thereof swings downward and trips the counter mechanism before being penetrated by the prongs 97 or plate 98, as the clamp is opened on account of engaging the guide element 95. Prongs 97 are so short that they can not support the fish, but the latter slides down through chute 99 to a lower floor. Preferably the brushes rotate in the direction indicated by the dot and dash arrows of Fig. 1, i. e., in a direction such that the portions thereof which engage the fish are moving opposite to the direction of movement of the fish itself and their yieldably mounted spills permit the brushes to conform to the shape of the body of each fish as it passes between them. The yieldable mounting of the upper brushes and the adjustment of the position of the guide bars 70 for the chain permits the machine readily to be adapted to fish of various sizes, while elevators 123 prevent the spills of the brushes from being caught in the clamps. The horizontal guide bar 107 extending along the intermediate portion of the table serves to hold the clamps in their locked position and prevent accidental opening of the same while the fish is being drawn between the rotating brushes.

I claim:

1. A machine of the class described comprising endless conveyor means, clamps carried by said conveyor means, said clamps each comprising a pair of hinged members resiliently pressed toward each other, one of said members having a re-entrant intermediate portion spaced from the other member, the intermediate portions of said members having registering prongs and recesses, and means for holding said prongs in said recesses during a portion of the movement of the clamp along the path of the endless carrier and separated from the same during another portion of said movement.

2. A machine of the class described comprising endless conveyor means, clamps carried by said conveyor means, said clamps each comprising a pair of members, one of said members being fixed on the endless conveyor means and having a re-entrant intermediate portion spaced from the other member, said second-named member being pivoted to and yieldably urged toward the fixed clamp member, prongs upon the intermediate portion of the second member and registering recesses in the intermediate portion of the first member, and means for holding said prongs in said recesses during a portion of the movement of the clamp along the path of the endless carrier and separated from the same during another portion of said movement.

3. A machine of the class described comprising a pair of similar endless conveyor elements, a series of clamps each having a part spanning the space between said elements and a part pivotally connected thereto and yieldably urged toward the first-named part, prong members upon each clamp adapted to penetrate a member gripped therein, the second-named part of each clamp having an outward extension, a curved guide element upon which said extensions are adapted to ride to open the clamp at one part of its journey.

4. A machine of the class described comprising a pair of similar endless conveyor elements, a series of clamps each having a part spanning the space between said elements and a part pivotally connected thereto and yieldably urged toward the first-named part, prong members upon each clamp adapted to penetrate a member gripped therein, the second-named part of each clamp having an outward extension, spaced guide elements upon which said extensions are adapted to ride to open said clamps twice during one circuitous movement.

5. A machine of the class described comprising a pair of similar endless conveyor elements, a series of clamps each having a part spanning the space between said elements and a part pivotally connected thereto and yieldably urged toward the first-named part, prong members upon each clamp adapted to penetrate a member gripped therein, the second-named part of each clamp having an outward extension, spaced guide elements upon which said extensions are adapted to ride to open said clamps twice during one circuitous movement, and means for guiding a fish to the open clamp in one of its open positions.

6. A machine of the class described comprising a pair of similar endless conveyor elements, a series of clamps each having a part spanning the space between said elements and a part pivotally connected thereto and yieldably urged toward the first-named part, prong members upon each clamp adapted to penetrate a member gripped therein, the second-named part of each clamp having an outward extension, spaced guide elements upon which said extensions are adapted to ride to open said clamps twice during one circuitous movement, and means for guiding a fish to the open clamp in one of its open positions, and means for removing the fish from the prongs of the clamp in its other open position.

7. A machine of the class described comprising a pair of similar endless conveyor elements, a series of clamps each having a part spanning the space between said elements and a part pivotally connected thereto and yieldably urged toward the first-named part, prong members upon each clamp adapted to penetrate a member gripped therein, the second-named part of each clamp having an outward extension, spaced guide elements upon which said extensions are adapted to ride to open said clamps twice during one circuitous movement, and means comprising outstanding pins adapted to catch a fish located in the clamp and to aid withdrawal of the clamp prongs therefrom.

8. A machine of the class described comprising a pair of similar endless conveyor elements, a series of clamps each having a part spanning the space between said elements and a part pivotally connected thereto and yieldably urged toward the first-named part, prong members upon each clamp adapted to penetrate a member gripped therein, the second-named part of each clamp having an outward extension, spaced guide elements upon which said extensions are adapted to ride to open said clamps twice during one circuitous movement, and a guide element paralleling the path of the clamp and adapted to be juxtaposed to a portion of the clamp extension during a part of its movement, whereby accidental opening of the clamp is substantially prevented.

9. A machine of the class described comprising a pair of similar endless conveyor elements, a series of clamps each having a part spanning the space between said elements and a part pivotally connected thereto and yieldably urged toward the first-named part, prong members upon each clamp adapted to penetrate a member gripped therein, the second-named part of each clamp having an outward extension, spaced guide elements upon which said extensions are adapted to ride to open said clamps twice during one circuitous movement, means holding a portion of the endless conveyor elements at a predetermined level for a part of its journey between said guide elements, and scale removing factors adjoining this portion of the machine.

10. A machine of the class described comprising a pair of similar endless conveyor elements, a series of clamps each having a part spanning the space between said elements and a part pivotally connected thereto and yieldably urged toward the first-named part, prong members upon each clamp adapted to penetrate a member gripped therein, the second-named part of each clamp having an outward extension, spaced guide elements upon which said extensions are adapted to ride to open said clamps twice during one circuitous movement, means holding a portion of the endless conveyor elements at a predetermined level for a part of its journey between said guide elements, and scale removing factors adjoining this portion of the machine, said scale removing factors comprising oppositely rotatable brushes.

11. A machine of the class described comprising a pair of parallel endless conveyor chains, spaced clamps connecting portions of the chains, said clamps comprising a main portion fixed to the chains, and a portion hinged to the main portion, said portions being provided with prongs and registering recesses whereby a fish may be gripped therebetween, spring means normally urging the clamp portions toward each other and a flange upon one of the elements adapted to cover a portion of the space between the clamp portions in order to prevent accidental catching of foreign objects therebetween.

12. A machine of the class described comprising a pair of parallel endless conveyor chains, spaced clamps connecting portions of the chains, said clamps comprising a main portion fixed to the chains, and a portion hinged to the main portion, said portions being provided with prongs and registering recesses whereby a fish may be gripped therebetween, spring means normally urging the clamp portions toward each other, the main portion of said clamp being provided with a flange which is adapted to bear upon an adjacent portion of the chain in order to brace the clamp against tilting when the adjoining chain is moving in a substantially straight path.

13. A machine of the class described comprising endless conveyor means, clamps carried by said conveyor means, means for opening said clamps at one part of their movement with the conveyor means, means for closing the clamps and maintaining them closed during a portion of their path, a scale-removing factor yieldably held adjoining this portion of the path of the clamps, means for moving the scale-removing factor away from the conveyor to permit it to clear the clamps, said means including cam members mounted upon the endless conveyor means adjoining each clamp and a cooperating follower secured to the yieldably mounted scale-removing factor.

14. A machine of the class described comprising endless conveyor means, clamps carried by said conveyor means, means for opening said clamps at one part of their movement with the conveyor means, means for closing the clamps and maintaining them closed during a portion of their path, a scale-removing factor mounted upon the outer end of a swinging arm adjoining this portion of the path of the clamps and held by gravity near the path of movement of the clamps, a counter weight partially to balance the weight of the scale removing elements, means for moving the scale-removing factor away from the conveyor to permit it to clear the clamps.

15. A machine of the class described comprising endless conveyor means, clamps carried by said conveyor means, means for opening said clamps at one part of their movement with the conveyor means, means for closing the clamps and maintaining them closed during a portion of their path, a scale-removing factor yieldably held adjoining this portion of the path of the clamps, means for moving the scale-removing factor away from the conveyor to permit it to clear the clamps, said means including cam members mounted upon the endless conveyor means adjoining each clamp and a cooperating follower secured to the yieldably mounted scale-removing factor, and a stop to limit the movement of the scale removing element, whereby the follower may be normally located above the path of the conveyor means, but in the path of the cams.

16. A machine of the class described comprising endless conveyor means, clamps carried by the conveyor means, each clamp comprising parts normally pressed together by a spring spaced guide element adapted to engage a portion of each clamp and to open the clamp at spaced portions of its path, an intermediate guide element normally slightly spaced from the path of the closed clamp between said spaced guide elements but being adapted to prevent accidental opening of the clamp, an extension upon said intermediate guide element adapted to effect the closing of a clamp which has left one of the spaced guide elements and has not been closed under the action of the spring.

17. A machine of the class described comprising endless conveyor means, fish gripping clamps thereon adapted to be automatically opened, closed and again opened during one circuitous movement with the conveyor means, fish treating elements adjoining the portion of the path of the clamps wherein they are closed, fish receiving means located below the portion of the conveyor means which has left the fish treating elements, a movable element located in the normal path of a fish as it drops from an opened clamp to the receiving means, and a counter operatively connected to the movable elements whereby the number of fish dropped from the clamp to the receiving means may be recorded.

18. A machine of the class described comprising endless conveyor means, a series of clamps carried by the conveyor means, each of said clamps being provided with prongs to penetrate and grip a fish, fish treating elements to act upon the fish held by the clamps, a combined feeding trough and guard adapted to guide the fish into a position wherein it may be engaged by an opened clamp and adapted to guard the hands of an operator feeding the fish to the clamps.

Signed by me at Boston, Massachusetts this 16th day of February, 1927.

ERNEST A. GALLISON.